United States Patent
Brixius et al.

(10) Patent No.: US 6,897,625 B2
(45) Date of Patent: May 24, 2005

(54) LOAD-DEPENDENT ASYNCHRONOUS DRIVE FOR A TRANSPORT PATH

(75) Inventors: Wolfgang Brixius, Neunkirchen (DE); Dominik Gräfer, Nürnberg (DE); Albrecht Hoene, Herzogenaurach (DE); Gerhard Hoffmann, Nürnberg (DE); Rainer Junk, Grossenseebach (DE); Günther Spitzer, Lautertal (DE); Friedrich Trautner, Emskirchen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/636,914

(22) Filed: Aug. 7, 2003

(65) Prior Publication Data

US 2004/0075405 A1 Apr. 22, 2004

(30) Foreign Application Priority Data

Aug. 7, 2002 (DE) .......................... 102 36 170

(51) Int. Cl.$^7$ .......................... H02P 5/46; B65G 37/00; B65G 43/00; B65G 43/10
(52) U.S. Cl. ......................... 318/69; 318/34; 198/571; 198/572; 198/575; 198/576; 198/577; 198/608
(58) Field of Search ................. 198/571, 572, 198/575, 576, 577, 608, 619, 634, 788, 761, 762, 810.04; 318/69, 646, 34

(56) References Cited

U.S. PATENT DOCUMENTS

| | | | | |
|---|---|---|---|---|
| 4,772,837 A | * | 9/1988 | MacMunn | 318/687 |
| 5,070,995 A | * | 12/1991 | Schaffer et al. | 198/460.1 |
| 5,318,167 A | * | 6/1994 | Bronson et al. | 198/577 |
| 5,359,154 A | | 10/1994 | Tsukasa et al. | |
| 5,979,636 A | * | 11/1999 | Vanacore et al. | 198/460.1 |
| 6,378,694 B1 | * | 4/2002 | Onoyama et al. | 198/781.06 |
| 6,629,593 B2 | * | 10/2003 | Zeitler | 198/460.1 |
| 6,662,931 B2 | * | 12/2003 | Bruun et al. | 198/617 |
| 6,729,463 B2 | * | 5/2004 | Pfeiffer | 198/460.1 |
| 6,751,524 B2 | * | 6/2004 | Neary et al. | 700/230 |

FOREIGN PATENT DOCUMENTS

| | | | | |
|---|---|---|---|---|
| JP | 56088020 A | | 7/1981 | |
| JP | 59186826 A | | 10/1984 | |
| JP | 62215414 A | | 9/1987 | |
| JP | 04119408 A | * | 4/1992 | G05D/3/12 |
| JP | 05246528 | | 9/1993 | |
| JP | 2001 080725 | | 3/2001 | |
| WO | WO 9930993 | | 6/1999 | |
| WO | WO 01/85582 | | 11/2001 | |

* cited by examiner

Primary Examiner—David Martin
Assistant Examiner—Patrick Miller
(74) Attorney, Agent, or Firm—Henry M. Feiereisen

(57) ABSTRACT

A conveyor system for transported goods which are transported with a preset transport speed and method for operating the conveyor system are described. The individual conveyers of the system are driven by asynchronous motors. Sensors associated with the conveyors measure the actual transport speed of the transported goods on conveyors to determine the dependence of the actual transport speed on the load, such as the weight of the transported goods. A controller adjusts the speed of the conveyors based on the signals received from the sensors.

10 Claims, 4 Drawing Sheets

LOAD-DEPENDENT ASYNCHRONOUS DRIVE FOR A TRANSPORT PATH

CROSS-REFERENCES TO RELATED APPLICATIONS

This application claims the priority of German Patent Application, Serial No. 102 36 170.3, filed Aug. 7, 2002, pursuant to 35 U.S.C. 119(a)–(d), the disclosure of which is incorporated herein by reference.

BACKGROUND OF THE INVENTION

The present invention relates to a load-dependent asynchronous drive for a plurality of conveyors which are assembled to form a transport path, with the individual conveyors forming a common conveyor system. The conveyor system is provided with a suitable sensor system, such as light barriers, light scanners, inductive sensors etc. for controlling the individual conveyors.

Uncontrolled or free-running asynchronous motors typically have a problem in that the rotation speed of these drives is load-dependent. Accordingly, when asynchronous motors are used with conveyor systems, the transport speed disadvantageously depends on the weight of the transported goods. Moreover, the relative spacing between transported goods with different weight can change at the transition from one conveyor to the next. Since the relative displacement of the transported goods can in general not be predicted because their weight is typically unknown, these displacements create uncertainties which has to be taken into account when monitoring and processing the data. These uncertainties adversely affect certain variables, such as material flow, transport time to cover a planned transport path, and data security.

The following conventional methods are employed to eliminate the aforedescribed disadvantages:

a) Rotation speed feedback: in this case, the motor rotation speed or the speed of the conveyor belt are measured and deviations from the desired value are controlled. This increases the complexity of the measurement equipment and the controller.

b) Use of servo machines: in this case, drives are used where the characteristic curve is so steep that differences in the rotation speed are negligible. However, this solution is more expensive.

c) Use of synchronous machines: for controlling synchronous machines, the angular pole position, i.e., the rotor position, has to be known. The rotation speed of synchronous machines is advantageously synchronous to a preset value. However, the rotor position must disadvantageously be fed back, which is as complex as the feedback of the rotation speed discussed above with reference to a).

d) Use of electronically commutated DC machines: the same problems as described above with reference to c) apply here. i.e., the rotor position has to be known for commutation.

It would therefore be desirable and advantageous to provide a simple low-cost and highly reliability drive control, which obviates prior art shortcomings and is able to specifically eliminate severe speed variations and the associated backup of the transported goods.

SUMMARY OF THE INVENTION

According to one aspect of the present invention, a conveyor system for transported goods which are transported with a preset transport speed, includes a plurality of conveyors, asynchronous motors associated with the conveyors in one-to-one correspondence, sensors associated with the conveyors for measuring an actual transport speed of the conveyors to determine a load dependence of the actual transport speed, and a controller receiving control signals from the sensors for compensating differences in the preset transport speed and the actual transport speed, wherein the sensors associated with the conveyors measure a temporal separation or travel time between directly adjacent transported goods when the goods travel past a sensor a conveyor and the temporal separation or travel time is used to control the asynchronous motor of a following conveyor arranged in the transport direction, thereby compensating differences in conveying speed.

According to another aspect of the present invention, a conveyor system for transported goods which are transported with a preset transport speed, includes a plurality of conveyors, asynchronous motors associated with the conveyors in one-to-one correspondence, sensors associated with the conveyors for measuring an actual transport speed of the conveyors to determine a load dependence of the actual transport speed, and a controller receiving control signals from the sensors for compensating differences between the preset transport speed and the actual transport speed, wherein the sensors, which are arranged in the conveying direction in the front section of the conveyor, measure a temporal separation between directly adjacent transported goods when the goods travel past a sensor, wherein the two directly adjacent transported goods are still located on the same conveyor after measurement of their temporal separation, and wherein the measured temporal separation is used to determine the travel speed by controlling the asynchronous motor associated with the same conveyor.

The system according to the invention continues to employ a cost-effective asynchronous drive, so that the effect of a load dependent rotation speed, where the rotation speed is asynchronous to the preset value, is still observed. However, sensors (light barriers, light scanners, inductive sensors, etc.) located on the conveyors which are provided for controlling the conveyor independent of the aforedescribed problem, are used to measure the effects of the load on the rotation speed, with the goal to control the effect on the transport speed via a closed control circuit.

According to an advantageous feature of the invention, the effect of the load on the rotation speed is measured by the sensors of the conveyor based on the temporal separation between adjacent transported goods during their travel or the travel time of a transported good on a conveyor. This can be accomplished, for example, by using a timer.

According to another advantageous feature of the invention, a sensor associated with a conveyor measures the time difference between successive transported goods on the conveyor and derives from the time difference the base valuable for controlling a converter and for controlling the drive motor of that conveyor or of an adjacent conveyor via feedback to the converter frequency and converter voltage.

According to another advantageous feature of the invention, a nominal temporal separation of the transported goods is preset for each conveyor, which is dependent on the nominal transport speed, the throughput and the length of the conveyor, wherein the actual spacing is measured by the sensors of the conveyor and the difference is used as control deviation (as input variable) for the controller.

According to another advantageous feature of the invention, the travel time of the goods transported on the conveyors is measured by the sensors associated with the conveyors. Since the length of the conveyor is known, the average speed can be computed from the travel time. This speed is the ACTUAL-speed of a conveyor, which is compared with the nominal speed. The difference between the ACTUAL-speed and the nominal speed is applied as a control deviation of the input of a control algorithm of the subsequent conveyor. Control algorithms can be, for example, P-, PI-, PID-algorithms, bi-level control algorithms, non-linear algorithms, etc. In this way, the effect of heavy-weight goods can be taken into account and controlled by the subsequent conveyor. The mutual spacing between the transported goods is evened out.

Unlike with conventional systems, no additional sensors are required since the existing sensors can be used. In addition, there is no need for complex rotation speed or position feedback circuitry so that low-cost asynchronous motors can advantageously be used.

The additional expense associated with additional controllers is also eliminated, because the system can be implemented using existing conveyor controls. The throughput is increased as a result of the constant transport speed, which can be achieved without separately timing the conveyors, and through elimination of backup effects. The higher average speed also reduces wear and noise as well as transport times and energy consumption. Data security is also enhanced through a more secure data tracking.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
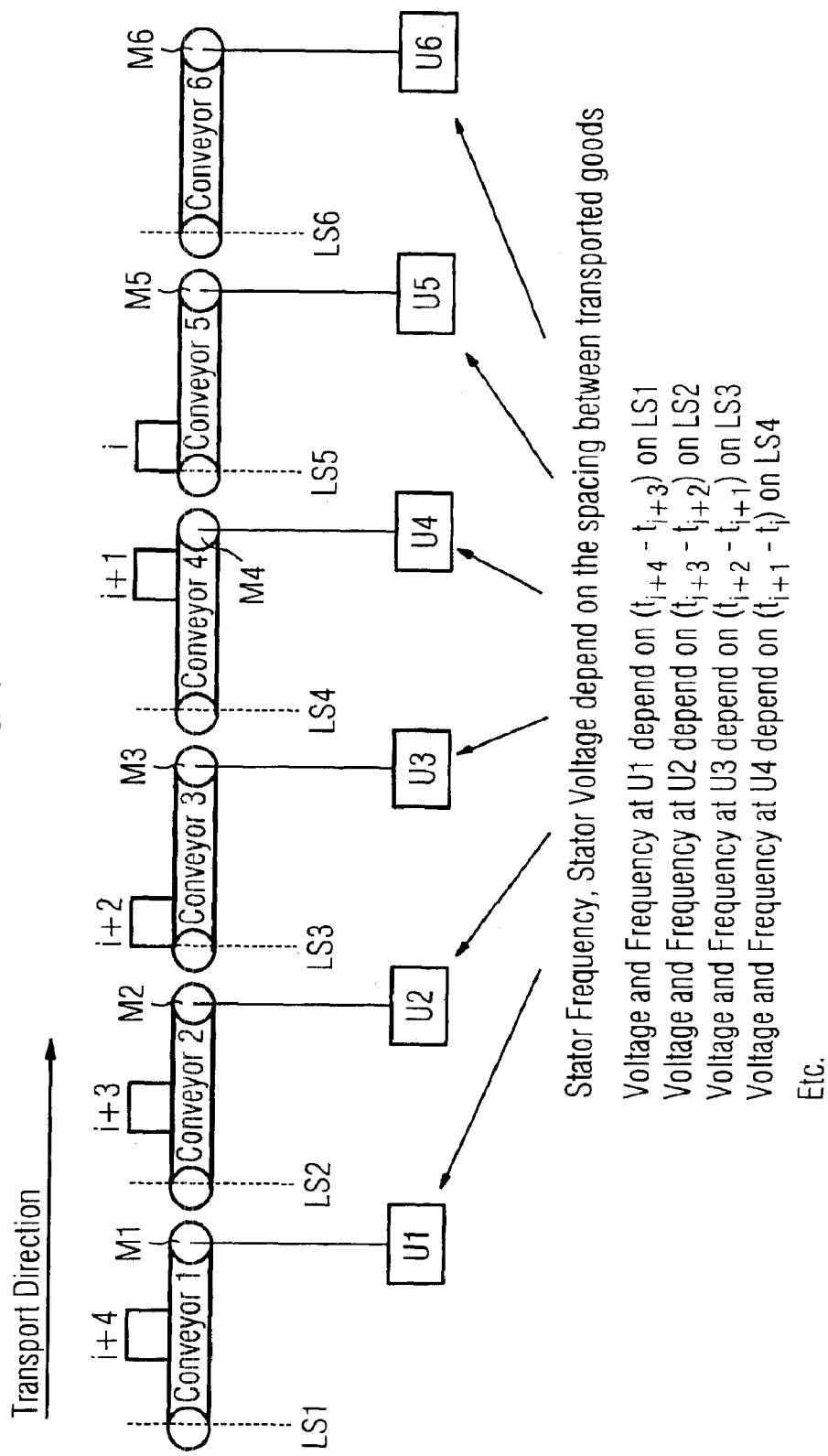
FIG. 1 shows schematically an exemplary process according to the invention for controlling the spacing between transported goods.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary control process for controlling the separation between transported goods. The light barriers LS4 of the conveyor 4 begins a time measurement when the transported good i passes through the light barrier LS4, with the time measurement terminated when the transported good i+1 passes through the light barrier LS4. The measured time difference $t(i+1)-t(i)$ is the base valuable for controlling the converter U4 which in turn controls the motor M1. The time measurement starts again immediately after passage of the transported good i+1 and ends when the transported good i+2 passes through the light barrier LS4. From the measured times, the time difference $t(i+2)-t(i+1)$ is computed, which is used for controlling the motor M4. The converter is controlled based on the respective measured time differences. The greater the time difference, i.e., the greater the separation between two transported goods, the greater are the values at which the converter frequency and the converter voltage are, which evens out larger spacings between the transported goods. The larger spacings between the transported goods may be caused by the fact that heavier transported goods (for example, transported goods i, i+2) tend to be transported more slowly than lighter transported goods (for example, transported good i+1). The effect caused by the weight of the transported goods can be measured by determining the spacing between goods and controlled through feedback by adjusting the converter frequency and converter voltage.

Figure 2:
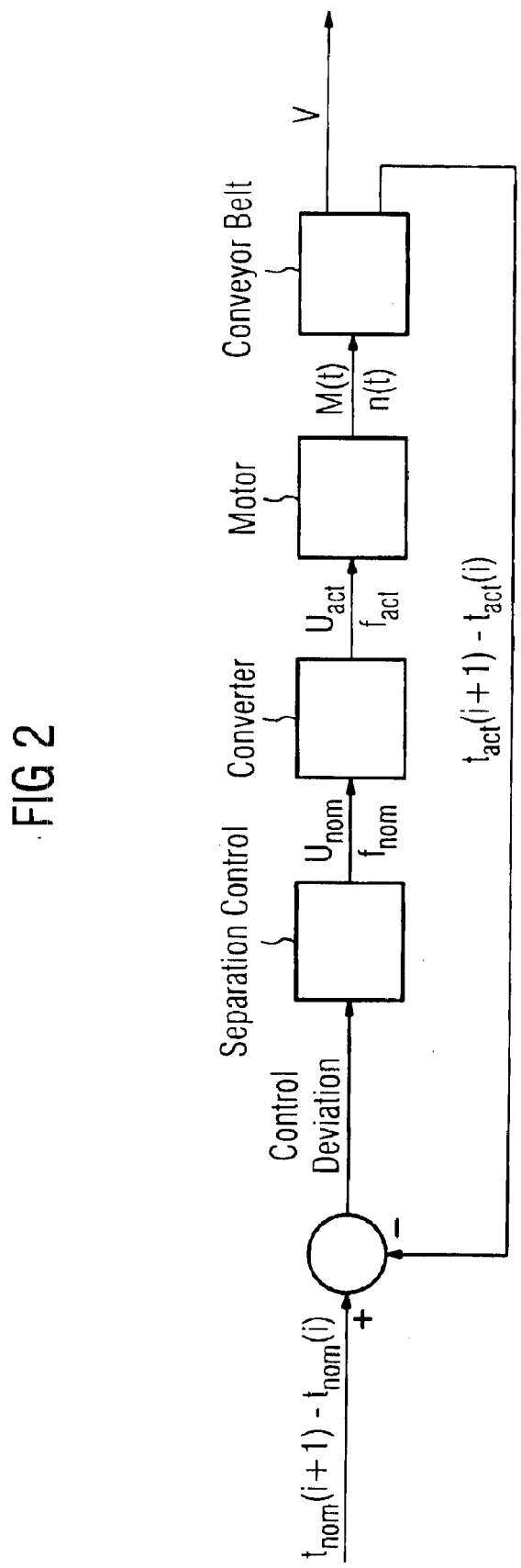
FIG. 2 shows schematically a control circuit associated with the process depicted in FIG. 1.

FIG. 2 depicts schematically the control circuit associated with the process of FIG. 1. A nominal temporal separation $t_{nom}(i)$ of the transported goods is preset for each conveyor i. The temporal separation $t_{nom}(i)$ depends on the nominal transport speed and the length of the conveyor, optionally also on the projected acceleration and deceleration. The actual separation $t_{act}(i)$ is measured as described above. The deviation $[\{t_{nom}(i+1)-t_{nom}(i)\}-\{t_{act}(i+1)-t_{act}(i)\}]$ is the input variable supplied to the controller. If the temporal separation between adjacent goods is too long, then the transport speed is increased by increasing the converter frequency $f_{act}$ and converter voltage $U_{act}$ relative to preset values $f_{nom}$ and $U_{nom}$, thereby compensating for the weight-dependent decrease in the transport speed. Controlling the separation between transported goods to a constant value has a positive effect by making the transport speed more uniform. The controller itself can be implemented as a P-controller or as a nonlinear controller.

Figure 3:
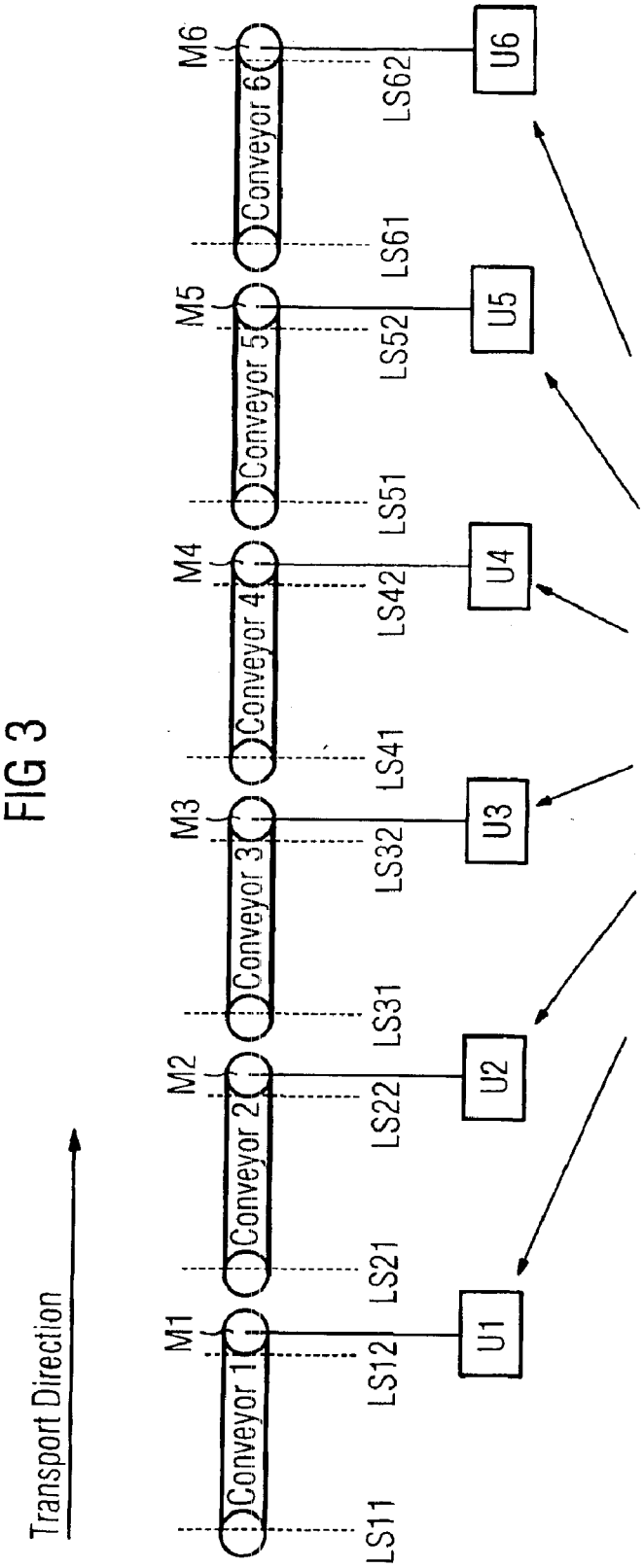
FIG. 3 shows schematically an exemplary process according to the invention for controlling the transport speed.
Figure 4:
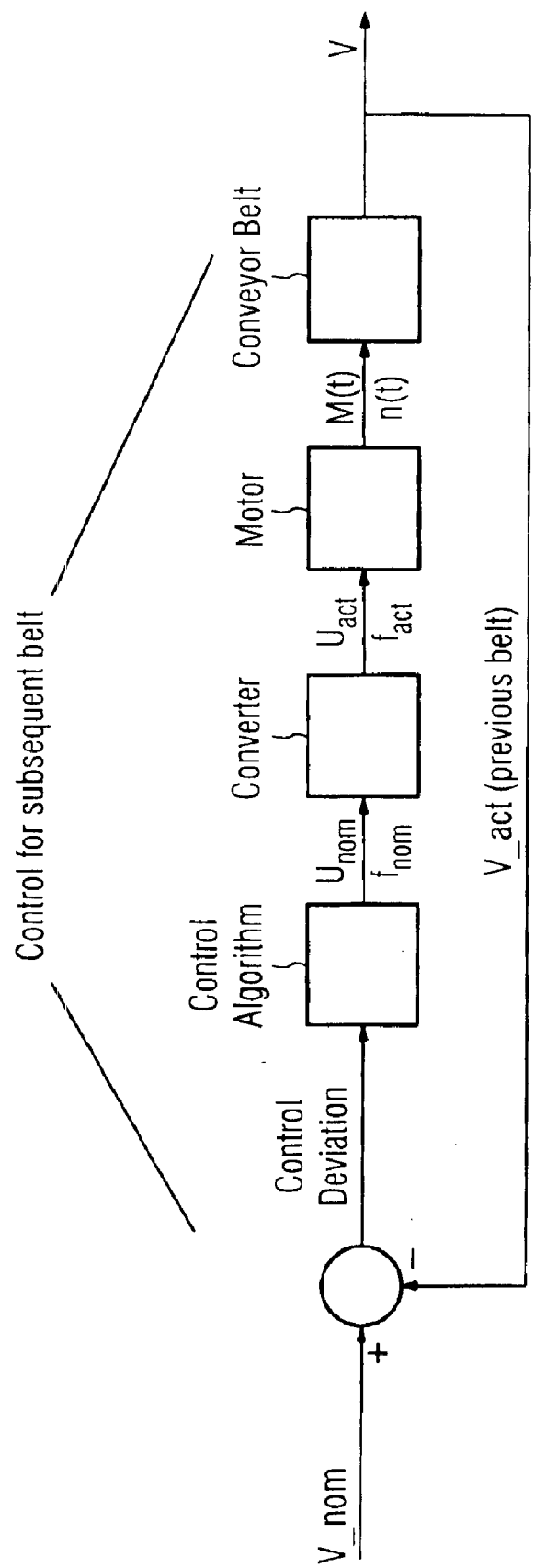
FIG. 4 shows schematically a control circuit associated with the process depicted in FIG. 3.

Alternatively, the travel time of the transported good on the conveyor can be measured by the sensors associated with the conveyor. The travel time can be used to compute the average speed, which will now be briefly described reference to FIGS. 3 and 4. As seen in FIG. 3, the travel time of the transported good on conveyor 1 is measured between the light barriers LS11 and LS12. The actual speed V_act of the transported good is determined from the distance between the light barriers LS11 and LS12. The conveyor 2 is controlled using the actual speed of conveyor 1 (see FIG. 4). The deviation from the nominal speed V_nom is determined and applied to the controller of conveyor 2 (FIG. 4). If the transported goods move too slowly on conveyor 1, then the implemented control algorithm will cause conveyor 2 to travel at a higher speed. In other words, the actual speed of the previous conveyor is used to correct the speed of the subsequent conveyor. In principle, the attributes of the conveyor before the previous conveyor or of other conveyors before that conveyor can be used as a correction value. These measurement values have to be suitably incorporated in the control algorithm.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A conveyor system for transported goods, comprising:
   a plurality of conveyors, each conveyor having a preset transport speed that depends on a length of the conveyor,
   a plurality of asynchronous motors associated with the conveyors, whereby the conveyors and the asynchronous motors are placed into one-to-one correspondence,
   a plurality of sensors associated with each of the conveyors for measuring an actual transport speed of the conveyors to determine a load dependence of the actual transport speed, and
   a controller receiving control signals from the sensors for compensating differences between the preset transport speed and the actual transport speed,
   wherein the sensors associated with one of the conveyors measure a an actual travel time for a transported good traveling at least two of the plurality of sensors located on the same conveyor, and wherein a difference between a nominal travel time and the actual travel time is supplied as a control signal to the controller to control the asynchronous motor of a downstream conveyor so that the downstream conveyor receives the goods with the actual transport speed of the one conveyor.

2. The system of claim 1, wherein the actual travel time is used to compute an average actual transport speed, with the average actual transport speed being compared to the preset speed for the conveyor, wherein the difference between the average actual transport speed and the preset speed is used to control the subsequent conveyor.

3. The system of claim 1, wherein the controller further includes a converter that controls a rotation speed of the asynchronous motors, with the preset transport speed determining a base parameter that controls a converter frequency and converter voltage of the converter.

4. The drive of claim 1, wherein in addition, accelerations and decelerations of the transported good are taken into consideration.

5. The drive of claim 1, wherein the controller its implemented as one of a proportional controller, proportional-integral controller, a proportional-integral-derivative controller, a bi-level controller and as a nonlinear controller.

6. A conveyor system for transported goods which are transported with a preset temporal separation between directly adjacent goods, comprising:
   a plurality of conveyors,
   asynchronous motors associated with the conveyors whereby the conveyors and the asynchronous motors are placed into one-to-one correspondence, a plurality of sensors associated with the conveyors in a one-to-one correspondence and arranged in an upstream section of the conveyors for measuring an actual temporal separation between directly adjacent transported goods when the goods travel past the sensor associated with one of the conveyors, and
   a controller receiving control signals from the sensor, and
   controlling the asynchronous motor associated with the corresponding one of the conveyors, while the two directly adjacent transported goods are still located on the corresponding one of the conveyers after measurement of their temporal separation, to convey the transported goods to a following conveyor with the preset temporal separation.

7. The system of claim 6, wherein the controller further includes a converter that controls a rotation speed of the asynchronous motors, with the preset temporal separation determining a base parameter that controls a converter frequency and converter voltage of the converter.

8. The system of claim 6, wherein a nominal temporal separation of the transported goods is preset for each conveyor, which depends on the preset transport speed and a length of the conveyor, and wherein the temporal separation is measured by the sensor associated with the conveyor and a difference between the nominal temporal separation and the temporal separation is supplied as an input variable to the controller.

9. The drive of claim 6, wherein in addition, accelerations and decelerations of the transported good are taken into consideration.

10. The drive of claim 6, wherein the controller its implemented as one of a proportional controller, proportional-integral controller, a proportional-integral-derivative controller, a bi-level controller and as a nonlinear controller.

* * * * *